US012590272B2

(12) United States Patent
Uchiyama et al.

(10) Patent No.: US 12,590,272 B2
(45) Date of Patent: Mar. 31, 2026

(54) HYDROPHOBIC FINISH CAR WASH COMPOSITIONS COMPRISING AN AMINOSILICONE AND AMPHOTERIC/NONIONIC SURFACTANT MIXTURE

(71) Applicant: Energizer Auto, Inc., St. Louis, MO (US)

(72) Inventors: Hirotaka Uchiyama, Loveland, OH (US); Caitlynn Diane Winter, Dayton, OH (US); Rajeev Menon, Dayton, OH (US)

(73) Assignee: Energizer Auto, Inc., St. Louis, MO (US)

( * ) Notice: Subject to any disclaimer, the term of this patent is extended or adjusted under 35 U.S.C. 154(b) by 397 days.

(21) Appl. No.: 17/915,738

(22) PCT Filed: Apr. 1, 2021

(86) PCT No.: PCT/US2021/025388

§ 371 (c)(1),
(2) Date: Sep. 29, 2022

(87) PCT Pub. No.: WO2021/202880

PCT Pub. Date: Oct. 7, 2021

(65) Prior Publication Data

US 2023/0130959 A1 Apr. 27, 2023

Related U.S. Application Data

(60) Provisional application No. 63/003,354, filed on Apr. 1, 2020.

(51) Int. Cl.

| | |
|---|---|
| ***C11D 1/94*** | (2006.01) |
| ***C11D 1/72*** | (2006.01) |
| ***C11D 1/75*** | (2006.01) |
| ***C11D 1/90*** | (2006.01) |
| ***C11D 3/37*** | (2006.01) |

(52) U.S. Cl.

CPC .............. *C11D 3/3742* (2013.01); *C11D 1/72* (2013.01); *C11D 1/75* (2013.01); *C11D 1/90* (2013.01); *C11D 1/94* (2013.01); *C11D 2111/10* (2024.01)

(58) Field of Classification Search

CPC ........... C11D 3/3742; C11D 1/72; C11D 1/75; C11D 1/90; C11D 1/94; C11D 1/82; C11D 2111/10; C11D 2111/14; C11D 9/36; C11D 2111/16; C11D 2111/18

See application file for complete search history.

(56) References Cited

U.S. PATENT DOCUMENTS

| | | | | |
|---|---|---|---|---|
| 5,433,890 | A | 7/1995 | Meyer et al. | |
| 6,506,715 | B1 * | 1/2003 | Schultz | C11D 3/18 106/806 |
| 6,669,763 | B1 * | 12/2003 | Ghodoussi | C09G 1/08 516/38 |
| 7,074,262 | B2 * | 7/2006 | Huang | C08J 3/02 106/3 |
| 8,492,481 | B2 * | 7/2013 | Yeung | C08F 297/00 510/276 |
| 8,765,655 | B2 * | 7/2014 | Yianakopoulos | C11D 3/2068 510/499 |
| 9,982,223 | B2 * | 5/2018 | Oh | C11D 3/2082 |
| 2010/0184855 | A1 | 7/2010 | Bernhardt et al. | |
| 2014/0308229 | A1 | 10/2014 | Bouzeloc et al. | |
| 2015/0030643 | A1 | 1/2015 | Gartstein et al. | |
| 2019/0117552 | A1 | 4/2019 | Rautschek et al. | |

FOREIGN PATENT DOCUMENTS

| | | | |
|---|---|---|---|
| EP | 0180253 | B1 | 11/1988 |
| EP | 1023424 | B1 | 9/2002 |
| JP | H0751718 | B2 | 6/1995 |
| WO | WO1999019438 | A1 | 4/1999 |

OTHER PUBLICATIONS

International Search Report and Written Opinion dated Jun. 22, 2021 in corresponding International Application No. PCT/US21/25388 (13 pages).

Extended European Search Report dated Apr. 23, 2024 for related European Application No. 21779136.7 (17 pages).

Stepan, "High Foaming for HI&I Cleaning", retrieved from <<https://www.stepan.com/content/dam/stepan-dot-com/webdam/website-product-documents/literature/household-institutional-industrial-cleaning/StepanHIIHighFoamingGuide.pdf>> on Apr. 3, 2024, 2 pages.

Stepan, "Merpol HCS", retrieved from <<https://pt.stepan.com/content/dam/stepan-dot-com/webdam/website-product-documents/product-bulletins/surfactants/MERPOLHCS.pdf>> on Apr. 3, 2024, 2 pages.

* cited by examiner

*Primary Examiner* — Charles I Boyer
(74) *Attorney, Agent, or Firm* — Lee & Hayes, P.C.

(57) ABSTRACT

Compositions and methods that impart a hydrophobic finish to surfaces, such as, for example, automotive surfaces. The compositions comprise an amino functional silicone emulsion, an amphoteric surfactant, and, a non-ionic surfactant.

20 Claims, 24 Drawing Sheets

HYDROPHOBIC FINISH CAR WASH COMPOSITIONS COMPRISING AN AMINOSILICONE AND AMPHOTERIC/NONIONIC SURFACTANT MIXTURE

CROSS-REFERENCE TO RELATED APPLICATIONS

This application is a U.S. national stage application under 35 U.S.C. § 371 of PCT International Application No. PCT/US2021/025388, filed Apr. 1, 2021, which claims the benefit of priority to U.S. Provisional Patent Application Ser. No. 63/003,354, entitled "Hydrophobic Finish Car Wash Compositions and Methods of Use Thereof." filed on Apr. 1, 2020, the content of both of which are hereby incorporated by reference in their entirety.

FIELD OF THE DISCLOSURE

Described herein are compositions and methods that impart a hydrophobic finish to surfaces, such as, for example, automotive surfaces. The compositions comprise an amino functional silicone emulsion, an amphoteric surfactant, and, a non-ionic surfactant.

BACKGROUND OF THE DISCLOSURE

Conventional car washes that provide wax deposition also known as "Wash and Wax", after washing the car surface do not provide a suitable hydrophobic finish. Current non-wax-based car washes that are available in the market that use $SiO_2$ or functionalized silicone-based technology provide a hydrophobic finish to the car surface after washing (compared to wash and wax), but these products have low foaming properties and also provide poor foam when used with a foam cannon—a device used to provide high foaming while washing the car using air pressure.

Conventional car washes that incorporate wax for hydrophobic finishes are generally high foaming as they use anionic surfactants. Typically, anionic surfactants have higher foamability compared to non-ionic and cationic surfactants. But, anionic surfactants when used with typical non-wax-based hydrophobic agents, form complexes and this, in turn, fails to provide a hydrophobic finish. This is due to the fact that traditional non-wax-based hydrophobic agents are cationic in charge. Cationic being positive and anionic being negative, the charge is canceled, rendering the hydrophobic agent ineffective.

One example of a cationically-charged silicone-based hydrophobic agent that is being used in the present disclosure is an amino siloxane. Amino siloxanes have a positive charge, which when they come in contact with the surface of, for example, a car (paint, wheel, rubber, glass), bond with the negative charge present on the surface, leaving behind a coating of silicone, which is hydrophobic.

The present disclosure solves the issue of high foaming without the use of anionic surfactants by using a combination of an amphoteric and non-ionic surfactant, while providing a hydrophobic finish by using an amino siloxane.

SUMMARY OF THE DISCLOSURE

In one aspect, the present disclosure is directed to a composition comprising: an amino functional silicone emulsion, an amphoteric surfactant, a first non-ionic surfactant, and, a second non-ionic surfactant.

In another aspect, the present disclosure is directed to a method of treating an automotive surface, the method comprising: applying a composition to an automotive surface, wherein the composition comprises: an amino functional silicone emulsion, an amphoteric surfactant, a first non-ionic surfactant, and, a second non-ionic surfactant.

In yet another aspect, the present disclosure is directed to a composition comprising an amino functional silicone emulsion, a first non-ionic surfactant comprising a non-ionic alcohol ethoxylate, a second non-ionic surfactant comprising a non-ionic alcohol ethoxylate, a lauryl/myristyl amidopropyl amine oxide, and, a polyethylene glycol.

DETAILED DESCRIPTION OF THE DISCLOSURE

Figure 1A:
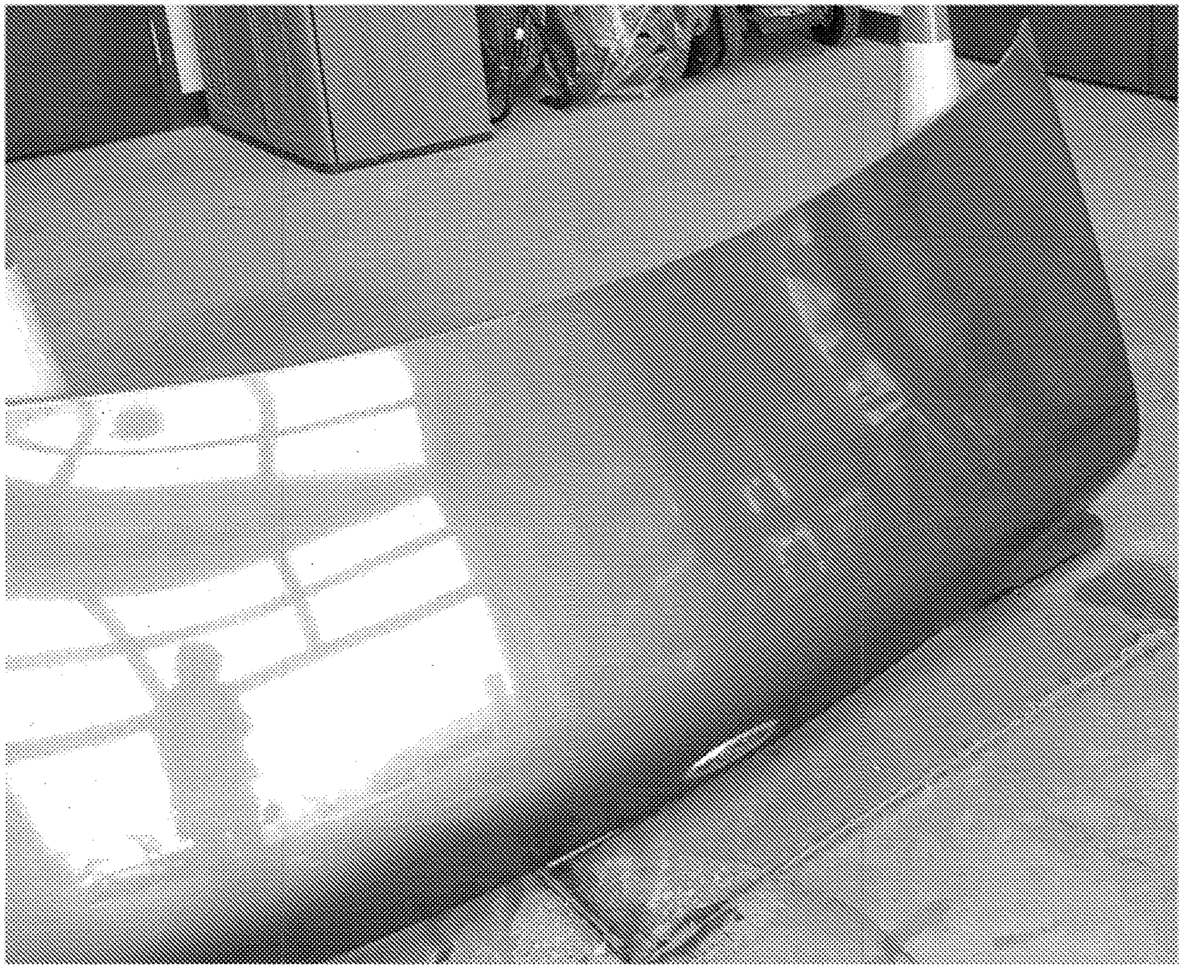
FIG. 1A depicts a car hood before spraying with composition I1 in accordance with the present disclosure.

Described herein are compositions and methods for imparting a hydrophobic finish to surfaces, such as an automotive surface.

In some embodiments of the present disclosure, the composition comprises an amino functional silicone emulsion, an amphoteric surfactant, and, a non-ionic surfactant.

In some embodiments of the present disclosure, the composition comprises an amino functional silicone emulsion, an amphoteric surfactant, a first non-ionic surfactant, and, a second non-ionic surfactant.

In some embodiments of the present disclosure, a method of treating an automotive surface is disclosed. The method comprises: applying a composition to an automotive surface, wherein the composition comprises: an amino functional silicone emulsion, an amphoteric surfactant, and, a non-ionic surfactant.

In some embodiments of the present disclosure, a method of treating an automotive surface is disclosed. The method comprises: applying a composition to an automotive surface, wherein the composition comprises: an amino functional silicone emulsion, an amphoteric surfactant, a first non-ionic surfactant, and, a second non-ionic surfactant.

In some embodiments, the amino functional silicone emulsion comprises an aminoalkyl-functional organopolysiloxane fluid and water. In some embodiments, the aminoalkyl-functional organopolysiloxane fluid is selected from the group consisting of an amine-alkyl/dimethyl copolymer, a polar amine/alkyl functional block, an amine/alkoxy endblocked silicone, and combinations thereof.

In some embodiments, the amino functional silicone emulsion comprises from about 30% to about 40% of an amino silicone polymer, from about 5% to about 15% glycol, from about 10% to about 20% of an alcohol ethoxylate (e.g., tridecanol ethoxylate) and from about 35% to about 45% water, by weight of the emulsion. In some embodiments, the amino functional silicone emulsion comprises from about 50% to about 70% water, less than about 1.0% of a pH adjuster (e.g., acetic acid), less than about 0.5% of a viscosity adjuster (e.g., sodium chloride), from about 10% to about 15% of an emulsifier, and from about 20% to about 35% of an amino silicone polymer, by weight of the emulsion. In some embodiments, the amino functional silicone emulsion is selected from the group consisting of Elkay LK Primasoft Power and Siltech E-4135.

In some embodiments, the amino functional silicone emulsion is soluble in water.

In some embodiments, the amino functional silicone emulsion has a pH of from about 3 to about 6.

In some embodiments of the present disclosure, the amino functional silicone emulsion is present in an amount of from about 0.5% to about 15%, from about 1% to about 10%, or from about 2% to about 4%, by weight of the composition.

In some embodiments, the amino functional silicone emulsion comprises an amino siloxane. In some embodiments, the amino siloxane is present in the emulsion of from about 15% to about 40%, from about 20% to about 35%, or from about 25% to about 30% by weight of the emulsion.

In some embodiments, the amphoteric surfactant is present in an amount of from about 0.5% to about 25%, from about 2% to about 20%, or from about 3% to about 12%, by weight of the composition. In some embodiments, the amphoteric surfactant is from about 25 wt. % to about 40 wt. %, or from about 30 wt. % to about 35 wt. %, or about 33 wt. % active. For example, in some embodiments, the composition comprises about 20% amphoteric surfactant, by weight of the composition, wherein the amphoteric surfactant is about 33 wt. % active, and thus the composition comprises about 6.6 wt. % active amphoteric surfactant by weight of the composition.

In some preferred embodiments, the amphoteric surfactant is present in an amount of from about 0.001% to about 5%, from about 0.001% to about 2%, from about 0.001% to about 1%, from about 0.001% to about 0.5%, or from about 0.001% to about 0.2%, by weight of the composition. In some preferred embodiments, the composition comprises about 0.1515% amphoteric surfactant, by weight of the composition, wherein the amphoteric surfactant is about 33 wt. % active, and thus the composition comprises about 0.05 wt. % active amphoteric surfactant by weight of the composition.

In some embodiments, the amphoteric surfactant is selected from the group consisting of lauryl/myristyl amidopropylamine oxide (LMDO), a betaine, cocamidopropylamine oxide, lauramine oxide, myristyl/cetyl amine oxide, myristamine oxide, cocamidopropyl betaine, cocamidopropyl hydroxysultaine, and combinations thereof. In some embodiments, the amphoteric surfactant is lauryl/myristyl amidopropylamine oxide (LMDO).

In some embodiments, the non-ionic surfactant is present in an amount of from about 0.5% to about 20%, from about 1% to about 15%, or from about 3% to about 10%, by weight of the composition. In some embodiments, the non-ionic surfactant is from about 40 wt. % to about 70 wt. %, or from about 50 wt. % to about 65 wt. %, or about 60 wt. % active. For example, in some embodiments, the composition comprises about 6% non-ionic surfactant, by weight of the composition, wherein the non-ionic surfactant is about 60 wt. % active, and thus the composition comprises about 3.6 wt. % active non-ionic surfactant by weight of the composition.

In some embodiments, the non-ionic surfactant has a hydrophilic-lipophilic balance (HLB) value of at least about 10, 11, 12, 13, 14, or 15. In some embodiments, the non-ionic surfactant has an HLB value of at least about 10, 12, or 15.

In many embodiments, the non-ionic surfactant has an initial or 5-minute Ross-Miles foam height in the range of from about 5 cm to about 25 cm. In some embodiments, the non-ionic surfactant has an initial or 5-minute Ross-Miles foam height in the range of from about 10 cm to about 20 cm. In some embodiments, the non-ionic surfactant has an initial or 5-minute Ross-Miles foam height of at least about 8 cm, 9 cm, 10 cm, 11 cm, 12 cm, 13 cm, 14 cm, or 15 cm. The initial Ross-Miles foam height provides an indication of the volume of foam upon application and the 5-minute Ross-Miles foam height provides an indication on the stability of foam after application.

In some embodiments of the present disclosure, the non-ionic surfactant is an alcohol ethoxylate. In some embodiments, the alcohol ethoxylate is selected from the group consisting of Merpol® HCS, Merpol® SH (branched tridecylalcohol ethoxylate), Tergitol® 15-S-12 (C12-14 secondary alcohol ethoxylate, 12 ethylene oxide (EO) groups), Tergitol® 15-S-15 (C12-14 secondary alcohol ethoxylate, 15 ethylene oxide (EO) groups), Tergitol® 15-S-20 (C12-14 secondary alcohol ethoxylate, 20 ethylene oxide (EO) groups), Tergitol® 15-S-30 (C12-14 secondary alcohol ethoxylate, 31 ethylene oxide (EO) groups) and Tergitol® 15-S-40 (C12-14 secondary alcohol ethoxylate, 41 ethylene oxide (EO) groups). In some embodiments, the non-ionic surfactant is Merpol® HCS.

In some preferred embodiments, the composition comprises at least two non-ionic surfactants. In some particularly preferred embodiments, the composition comprises two non-ionic surfactants.

In some embodiments, at least one of the first non-ionic surfactant and the second non-ionic surfactant has an HLB value of at least about 10, 11, 12, 13, 14, or 15. In some embodiments, at least one of the first non-ionic surfactant and the second non-ionic surfactant has an HLB value of at least about 10, 12, or 15. In some embodiments, the first non-ionic surfactant, the second non-ionic surfactant, or both the first non-ionic surfactant and the second non-ionic surfactant has an HLB value of at least about 10, 12, or 15.

In many embodiments, at least one of the first non-ionic surfactant and the second non-ionic surfactant has an initial or 5-minute Ross-Miles foam height in the range of from about 5 cm to about 25 cm. In some embodiments, at least one of the first non-ionic surfactant and the second non-ionic surfactant has an initial or 5-minute Ross-Miles foam height in the range of from about 10 cm to about 20 cm. In some embodiments, at least one of the first non-ionic surfactant and the second non-ionic surfactant has an initial or 5-minute Ross-Miles foam height of at least about 8 cm, 9 cm, 10 cm, 11 cm, 12 cm, 13 cm, 14 cm, or 15 cm. The initial Ross-Miles foam height provides an indication of the volume of foam upon application and the 5-minute Ross-Miles foam height provides an indication on the stability of foam after application.

In some embodiments, at least one of the first non-ionic surfactant and the second non-ionic surfactant is present in an amount of from about 0.5% to about 20%, from about 1% to about 15%, or from about 3% to about 10%, by weight of the composition. In some embodiments, at least one of the first non-ionic surfactant and the second non-ionic surfactant is present in an amount of from about 0.5% to about 30%, from about 1% to about 25%, or from about 3% to about 20%, by weight of the composition.

In some embodiments, at least one of the first non-ionic surfactant and the second non-ionic surfactant is present in an amount of from about 40 wt. % to about 70 wt. %, or from about 50 wt. % to about 65 wt. %, or about 60 wt. % active.

In some embodiments, at least one of the first non-ionic surfactant and the second non-ionic surfactant is present in an amount of from about 80 wt. % to about 100 wt. %, or from about 80 wt. % to about 98 wt. %, or from about 80 wt. % to about 95 wt. % active.

In some embodiments, the first non-ionic surfactant is a flash foaming surfactant. In some embodiments, the first non-ionic surfactant has an HLB value of at least about 14. In some embodiments, the first non-ionic surfactant has a Ross-Miles foam height of at least about 14 cm. In some embodiments, the first non-ionic surfactant is not limited by the 5-minute Ross-Miles foam height.

In some embodiments of the present disclosure, the first non-ionic surfactant is an alcohol ethoxylate. In some embodiments, the alcohol ethoxylate is selected from the group consisting of Merpol® HCS, Merpol® SH, Tergitol® 15-S-12, Tergitol® 15-S-15, Tergitol® 15-S-20, Tergitol® 15-S-30 and Tergitiol® 15-S-40. In some embodiments, the non-ionic surfactant is Merpol® HCS (60% active). In some embodiments, the non-ionic surfactant is Merpol® HCS (60% active) and has an HLB of 15 and an initial Ross-Miles foam height of 18 cm.

In some embodiments, the second non-ionic surfactant has an HLB value of at least about 12. In some embodiments, the second non-ionic surfactant has an initial Ross-Miles foam height of at least about 11 cm. In some embodiments, the Ross-Miles foam height does not decrease below 10 cm after 5 minutes.

In some embodiments, the second non-ionic surfactant is selected from the group consisting of BioSoft® N900 (Stepan) (C9-11 Alketh-3), T-Det® A 900 (Harcros) (C9-11 alketh-3), Bio-Soft® N91-6 (Stepan) (linear C9-11 alcohol ethoxylate, 6 EO groups), Bio-Soft® N91-8 (Stepan) (linear C9-11, alcohol ethoxylate, 8 EO groups), and combinations thereof.

In some particularly preferred embodiments, the composition comprises a first non-ionic surfactant with 60% active component, an initial Ross-Miles foam height of 18 cm, and an HLB of 15; and a second non-ionic surfactant with 98% active component, an initial Ross-Miles foam height of 11.7 cm, an HLB of 13, and a 5 minute Ross-Miles foam height of 11.4.

In some embodiments, the composition further comprises a foam stabilizer. In some embodiments, the foam stabilizer is present in an amount of from about 0.1% to about 10%, from about 1% to about 7%, or from about 2% to about 5%, by weight of the composition. In some embodiments, the foam stabilizer is present in an amount of about 2%, by weight of the composition.

In some embodiments, the foam stabilizer comprises polyethylene glycol. In some embodiments, the polyethylene glycol has a molecular weight of from about 100 g/mol to about 16,000 g/mol, from about 1,000 g/mol to about 12,000 g/mol, or from about 7,000 g/mol to about 9,000 g/mol.

In some embodiments, the foam stabilizer is a polyethylene glycol having a molecular weight of 8,000 g/mol, such as, for example, Carbowax™ PEG (polyethylene glycol) 8000.

In some embodiments of the present disclosure the composition further comprises a preservative. In some embodiments the preservative is present in an amount of from about 0.01% to about 0.1%, by weight of the composition. In some embodiments, the preservative is present in an amount of about 0.05%, by weight of the composition.

In some embodiments of the present disclosure, the composition further comprises a colorant. In some embodiments, the colorant is present in an amount of from about 0.1% to about 1.0%, by weight of the composition. In some embodiments, the colorant is present in an amount of about 0.35%, by weight of the composition.

In some embodiments, the composition further comprises a fragrance. In some embodiments, the fragrance is present in an amount of from about 0.01% to about 0.1%, by weight of the composition. In some embodiments, the fragrance is present in an amount of about 0.05%, by weight of the composition.

In some embodiments, the composition further comprises water. In some embodiments, the water is present in an amount of from about 50% to about 75%, by weight of the composition.

In some embodiments of the present disclosure, the composition is applied to an automotive surface. In some embodiments, the automotive surface is selected from the group consisting of a tire, wheel, glass, paint, hood, roof, trunk, an exterior part and all car exterior, and combinations thereof.

In some embodiments of the present disclosure, the composition is a fluid, such as a liquid. In some embodiments, the composition is a liquid and is applied by the means of aerosol, trigger sprayers, sponge, and combinations thereof.

In some embodiments, the compositions of the present disclosure are dissolved in water at normal agitation. For a bucket wash of a car, 1 oz. of the compositions is dissolved in 1 gallon of water to provide cleaning and also provide a hydrophobic finish to a car surface. For high-foaming car wash applications, such as using a foam cannon, 6-8 oz. of the above compositions are diluted in 32 oz. of water. The foamability of the compositions of the present disclosure matched the performance of other snow foam car wash products using a foam cannon when an 8 oz. dilution of the composition was used.

In some embodiments of the present disclosure, the composition comprises: an amino functional silicone emulsion (e.g., Elkay® LK Primasoft Power), a non-ionic alcohol ethoxylate (e.g., Merpol® HCS), a lauryl/myristyl amidopropyl amine oxide (e.g., Ammonyx® LMDO), and, a polyethylene glycol (e.g., Carbowax™ PEG 8000).

In some embodiments, the composition comprises the following formulation.

TABLE 1

Sample formulation.

| Ingredient | Wt. % | Intended Purpose |
|---|---|---|
| Water | 61.8965 | Diluent |
| Merpol ® HCS | 6 | Non-ionic Surfactant |
| Ammonyx ® LMDO | 20 | Amphoteric Surfactant |
| LK-Primasoft Power | 10 | Amino functional Siloxane |
| Troyguard ™ BC11 | 0.05 | Preservative |
| Carbowax ™ PEG 8000 | 2 | Foam stabilizer |
| Liquitint ® Green HMC | 0.0035 | Dye |
| Fragrance Porche Glass 631300 | 0.05 | Fragrance |
| Total | 100 | |

In some embodiments, the composition comprises the following formulation.

TABLE 2

Sample formulation.

| General Ingredient | Wt. % | Sample Ingredient |
|---|---|---|
| Diluent | 45-85 | Water |
| First non-ionic Surfactant | 0.5-20 | Merpol ® HCS |
| Second non-ionic Surfactant | 0.5-20 | T-Det ® A 900 |
| Foam stabilizer | 0-5 | Carbowax ™ PEG 8000 |
| Amphoteric Surfactant | 0.001-0.5 | Ammonyx ® LMDO |
| Amino functional Siloxane | 5-15 | Siltech ® E-4135 |
| Cationic surfactant | 0.001-5 | Uniquat ® QAC-50 |
| Dye | 0.001-1 | Liquitint ® Green HMC |
| Fragrance | 0.001-0.5 | Fragrance Porche Glass 631300 |

In some embodiments, the composition comprises the following formulation.

TABLE 3

Sample formulation.

| Ingredient | Wt. % |
|---|---|
| Water | 75.195 |
| Merpol ® HCS | 2.5 |
| T-Det ® A 900 | 10 |
| Carbowax ™ PEG 8000 | 2 |
| Ammonyx ® LMDO | 0.1515 |
| Siltech ® E-4135 | 10 |
| Uniquat ® QAC-50 | 0.1 |
| Liquitint ® Green HMC | 0.0035 |
| Fragrance Porche Glass 631300 | 0.05 |

The embodiments of this disclosure include:

1. A composition comprising:
an amino functional silicone emulsion,
an amphoteric surfactant, and,
a non-ionic surfactant or a first non-ionic surfactant and a second non-ionic surfactant.
2. The composition of embodiment 1, wherein the amino functional silicone emulsion comprises an aminoalkyl-functional organopolysiloxane fluid and water.
3. The composition of embodiment 2, wherein the aminoalkyl-functional organopolysiloxane fluid is selected from the group consisting of an amine-alkyl/dimethyl copolymer, a polar amine/alkyl functional block, an amine/alkoxy end-blocked silicone, and combinations thereof.
4. The composition of embodiment 1, wherein the amino functional silicone emulsion is selected from the group consisting of Elkay LK Primasoft Power and Siltech® E-4135.
5. The composition of embodiment 1, wherein the amino functional silicone emulsion is soluble in water.
6. The composition of embodiment 1, wherein the amino functional silicone emulsion has a pH of from about 3 to about 6.
7. The composition of embodiment 1, wherein the amino functional silicone emulsion is present in an amount of from about 0.5% to about 15%, from about 1% to about 10%, or from about 2% to about 4%, by weight of the composition.
8. The composition of embodiment 1, wherein the amphoteric surfactant is present in an amount of from about 0.001% to about 25%, from about 2% to about 20%, or from about 3% to about 12%, by weight of the composition.
9. The composition of embodiment 1, wherein the amphoteric surfactant is selected from the group consisting of lauryl/myristyl amidopropylamine oxide (LMDO), a betaine, cocamidopropylamine oxide, lauramine oxide, myristyl/cetyl amine oxide, myristamine oxide, cocamidopropyl betaine, cocamidopropyl hydroxysultaine, and combinations thereof.
10. The composition of embodiment 9, wherein the amphoteric surfactant is lauryl/myristyl amidopropylamine oxide (LMDO).
11. The composition of embodiment 1, wherein the non-ionic surfactant or at least one of the first non-ionic surfactant and the second non-ionic surfactant is present in an amount of from about 0.5% to about 20%, from about 1% to about 15%, or from about 3% to about 10%, by weight of the composition.
12. The composition of embodiment 1, wherein the non-ionic surfactant or at least one of the first non-ionic surfactant and the second non-ionic surfactant has an HLB value of at least about 10, 12, or 15.

13. The composition of embodiment 1, wherein the non-ionic surfactant or at least one of the first non-ionic surfactant and the second non-ionic surfactant has an initial Ross-Miles foam height of at least about 8 cm, 9 cm, 10 cm, 11 cm, or 12 cm.

14. The composition of embodiment 1, wherein the non-ionic surfactant or the first non-ionic surfactant is selected from the group consisting of Merpol® HCS, Merpol® SH, Tergitol® 15-S-12, Tergitol® 15-S-15, Tergitol® 15-S-20, Tergitol® 15-S-30 and Tergitiol® 15-S-40.

15. The composition of embodiment 14, wherein the non-ionic surfactant or the first non-ionic surfactant is Merpol® HCS.

16. The composition of embodiment 1, further comprising a foam stabilizer.

17. The composition of embodiment 16, wherein the foam stabilizer is present in an amount of from about 0.1% to about 10%, from about 1% to about 7%, or from about 2% to about 5%, by weight of the composition.

18. The composition of embodiment 17, wherein the foam stabilizer is present in an amount of about 2%, by weight of the composition.

19. The composition of embodiment 16, wherein the foam stabilizer comprises polyethylene glycol.

20. The composition of embodiment 19, wherein the polyethylene glycol has a molecular weight of from about 100 g/mol to about 16,000 g/mol, from about 1,000 g/mol to about 12,000 g/mol, or from about 7,000 g/mol to about 9,000 g/mol.

21. The composition of embodiment 19, wherein the foam stabilizer is Carbowax PEG 8000.

22. The composition of embodiment 1, further comprising a preservative.

23. The composition of embodiment 22, wherein the preservative is present in an amount of from about 0.01% to about 0.1%, by weight of the composition.

24. The composition of embodiment 23, wherein the preservative is present in an amount of about 0.05%, by weight of the composition.

25. The composition of embodiment 1, further comprising a colorant.

26. The composition of embodiment 25, wherein the colorant is present in an amount of from about 0.1% to about 1.0%, by weight of the composition.

27. The composition of embodiment 26, wherein the colorant is present in an amount of about 0.35%, by weight of the composition.

28. The composition of embodiment 1, further comprising a fragrance.

29. The composition of embodiment 28, wherein the fragrance is present in an amount of from about 0.01% to about 0.1%, by weight of the composition.

30. The composition of embodiment 29, wherein the fragrance is present in an amount of about 0.05%, by weight of the composition.

31. The composition of embodiment 1, further comprising water.

32. The composition of embodiment 31, wherein the water is present in an amount of from about 50% to about 75%, by weight of the composition.

33. The composition of embodiment 1, wherein the composition is applied to an automotive surface.

34. The composition of embodiment 33, wherein the automotive surface is selected from the group consisting of a tire, wheel, glass, paint, hood, roof, trunk, an exterior part and all car exterior, and combinations thereof.

35. The composition of embodiment 1, wherein the composition is a fluid, such as a liquid, and the liquid is applied by the means of an aerosol, a trigger sprayer, a sponge and combinations thereof.

36. A method of treating an automotive surface, the method comprising: applying a composition to an automotive surface, wherein the composition comprises:

an amino functional silicone emulsion, an amphoteric surfactant, and, a non-ionic surfactant or a first non-ionic surfactant and a second non-ionic surfactant.

37. A composition comprising:

an amino functional silicone emulsion, a non-ionic alcohol ethoxylate or a first non-ionic surfactant comprising a non-ionic alcohol ethoxylate and a second non-ionic surfactant comprising a non-ionic alcohol ethoxylate, a lauryl/myristyl amidopropyl amine oxide, and, a polyethylene glycol.

EXAMPLES

Without further elaboration, it is believed that one skilled in the art using the preceding description can utilize the present disclosure to its fullest extent. The following Examples are, therefore, to be construed as merely illustrative, and not limiting of the disclosure in any way whatsoever.

Example 1

The foaming profiles for formulations in accordance with the present disclosure (11-15) and a comparative formulation (C1) are shown in Table 4. Foaming profiles are labeled as not acceptable (–), good (+), or very good (++).

Figure 1B:
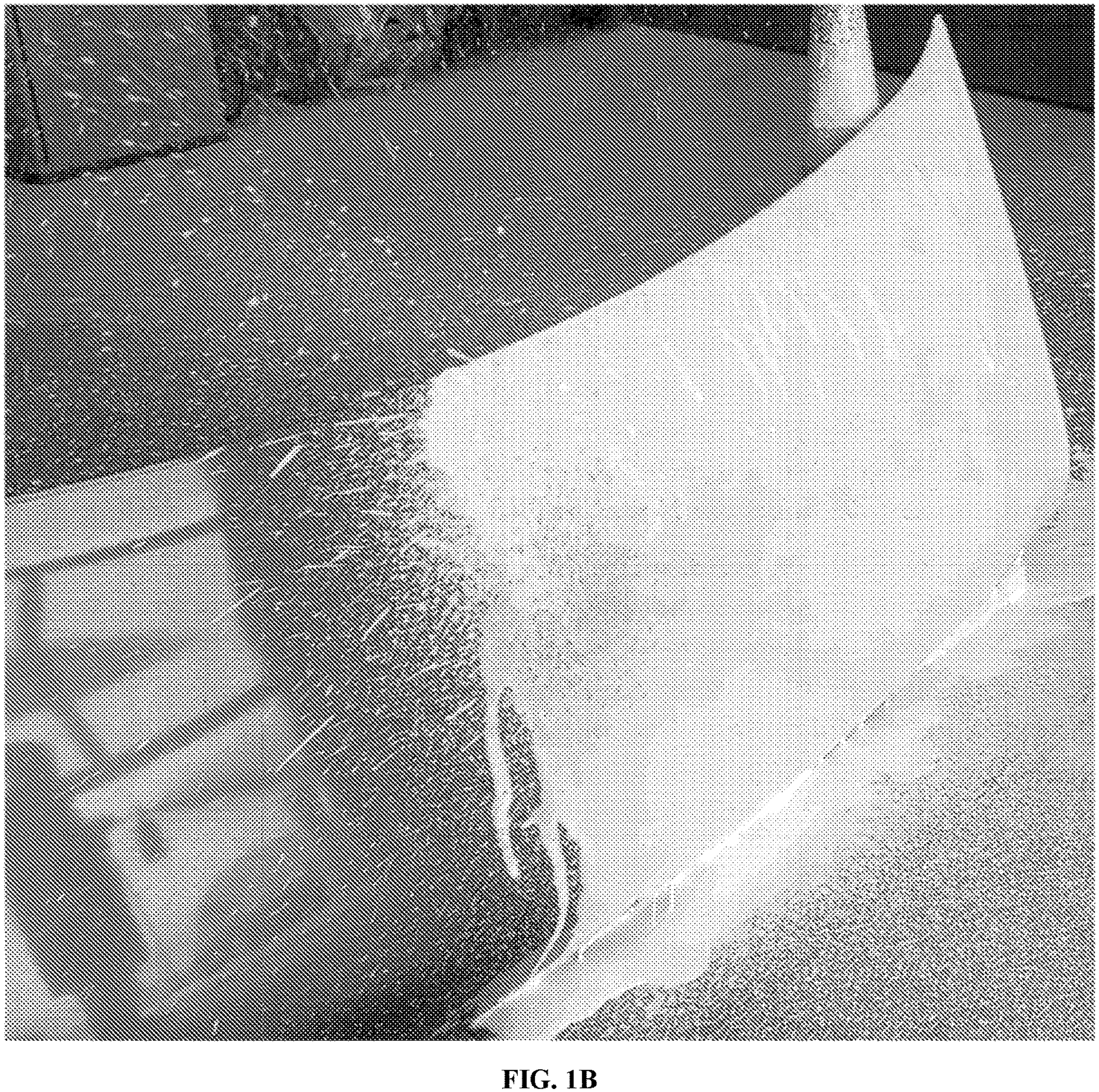
FIG. 1B depicts a car hood during spraying with composition I1 in accordance with the present disclosure.
Figure 1C:
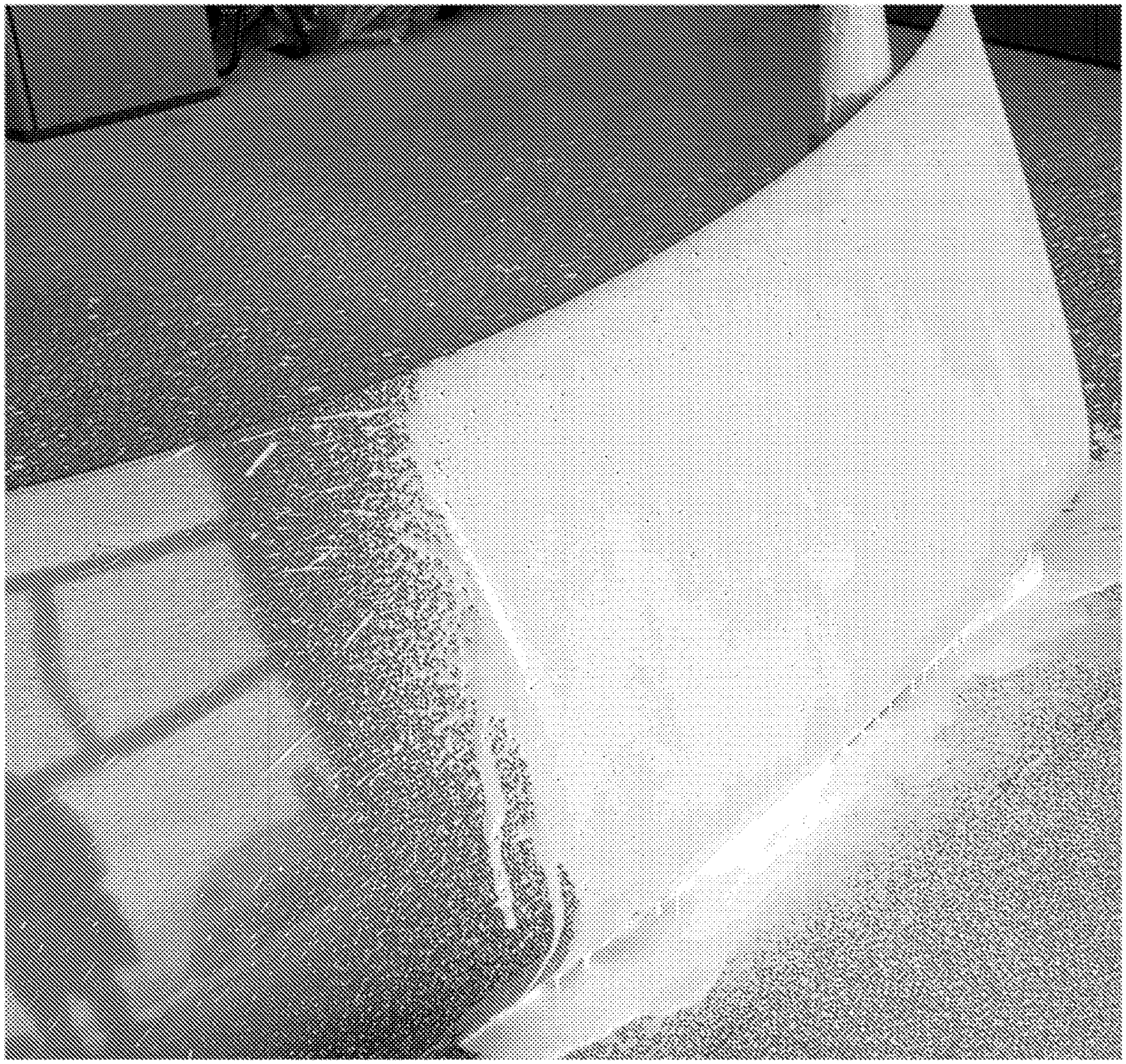
FIG. 1C depicts a car hood immediately after spraying with composition 11 in accordance with the present disclosure.
Figure 1D:
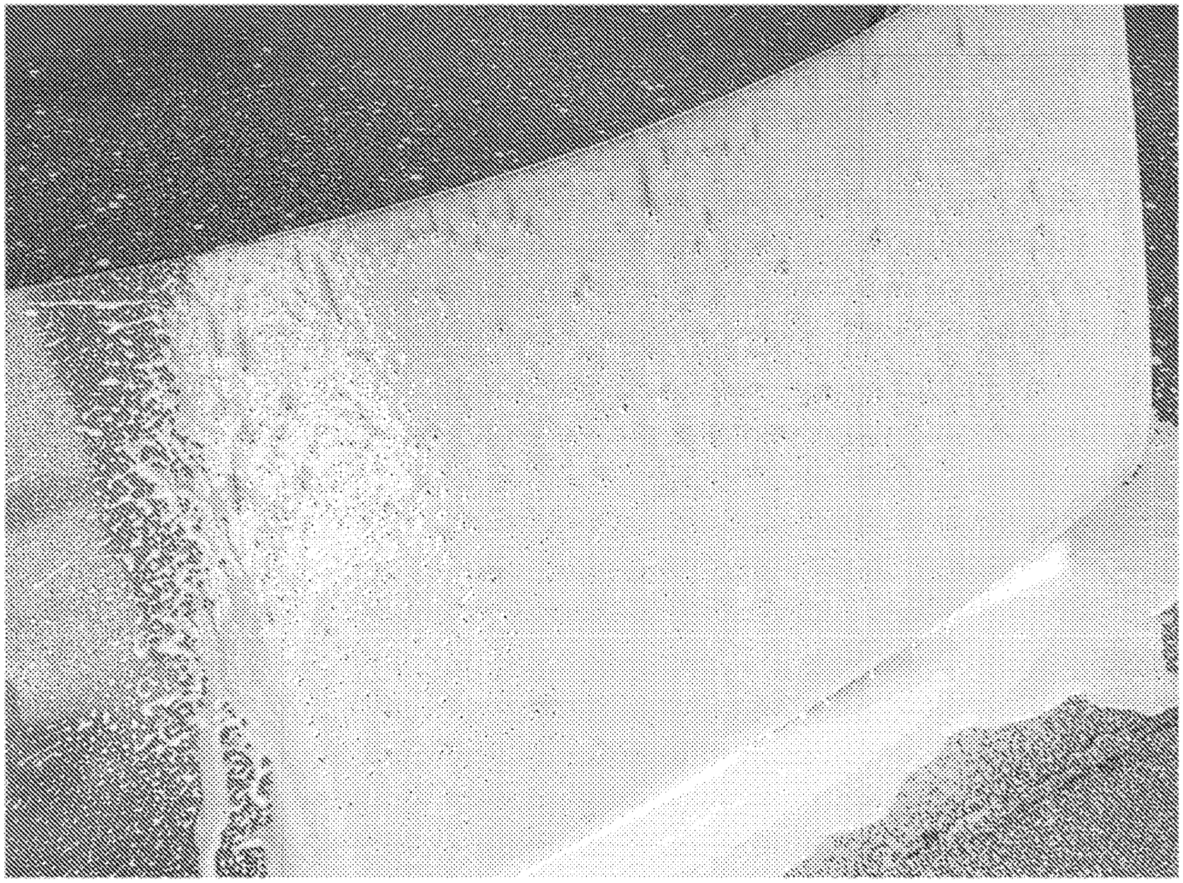
FIG. 1D depicts a car hood about 10 seconds after spraying with composition I1 in accordance with the present disclosure.
Figure 2A:
FIG. 2A depicts a car hood before spraying with composition I2 in accordance with the present disclosure.
Figure 2B:
FIG. 2B depicts a car hood during spraying with composition I2 in accordance with the present disclosure.
Figure 2C:
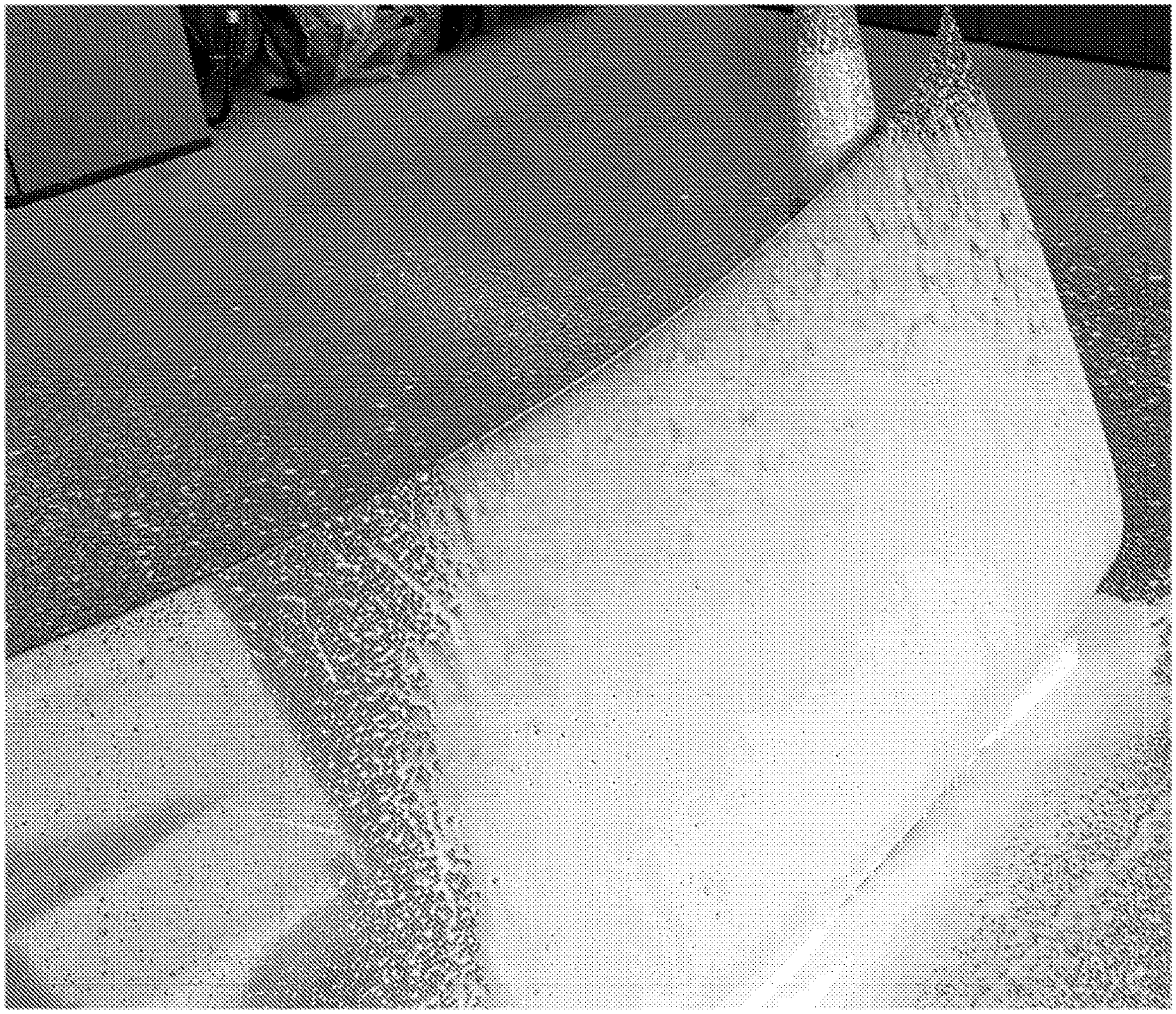
FIG. 2C depicts a car hood immediately after spraying with composition 12 in accordance with the present disclosure.
Figure 2D:
FIG. 2D depicts a car hood about 10 seconds after spraying with composition I2 in accordance with the present disclosure.
Figure 3A:
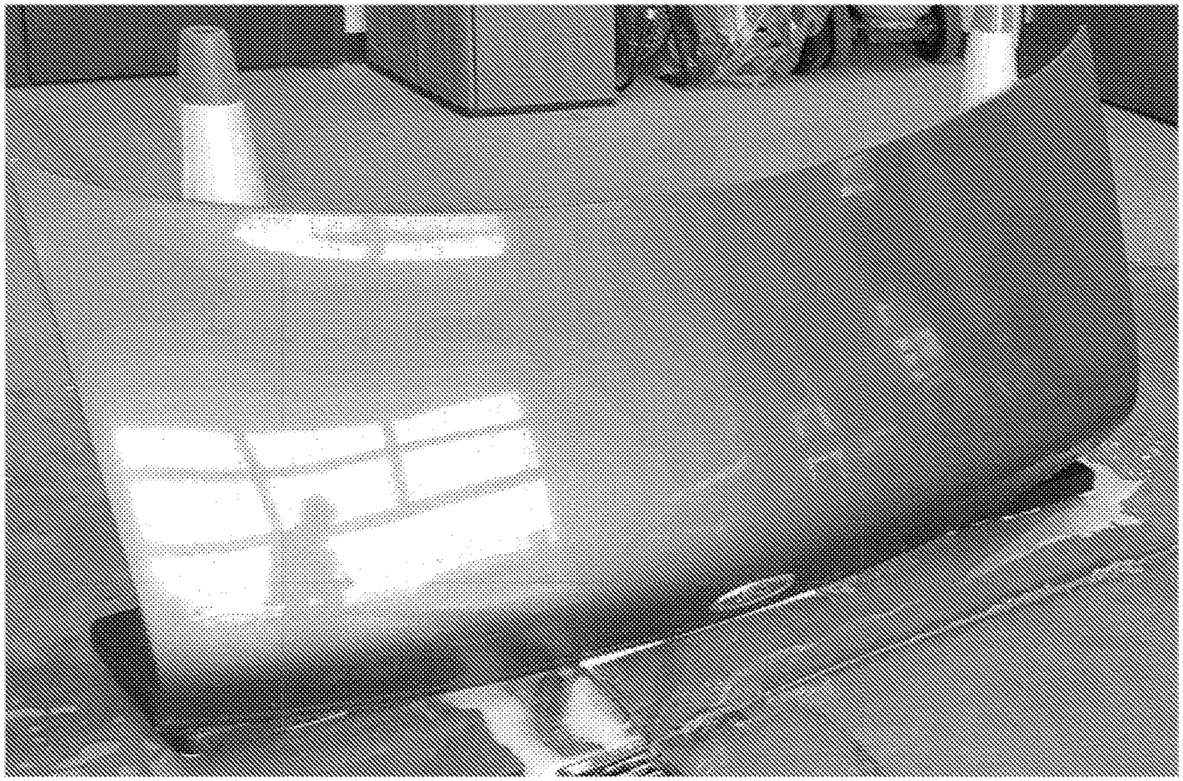
FIG. 3A depicts a car hood before spraying with composition I3 in accordance with the present disclosure.
Figure 3B:
FIG. 3B depicts a car hood during spraying with composition I3 in accordance with the present disclosure.
Figure 3C:
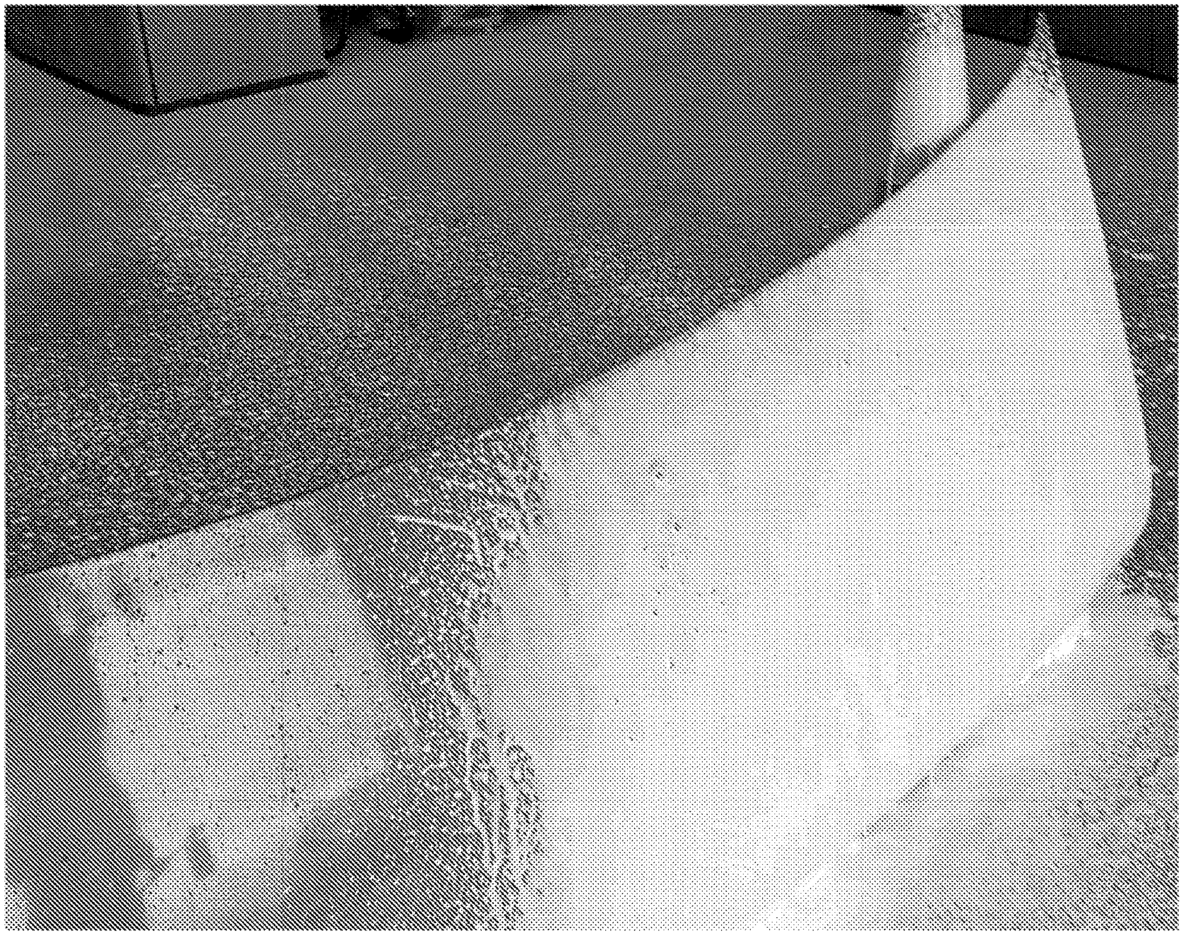
FIG. 3C depicts a car hood immediately after spraying with composition 13 in accordance with the present disclosure.
Figure 3D:
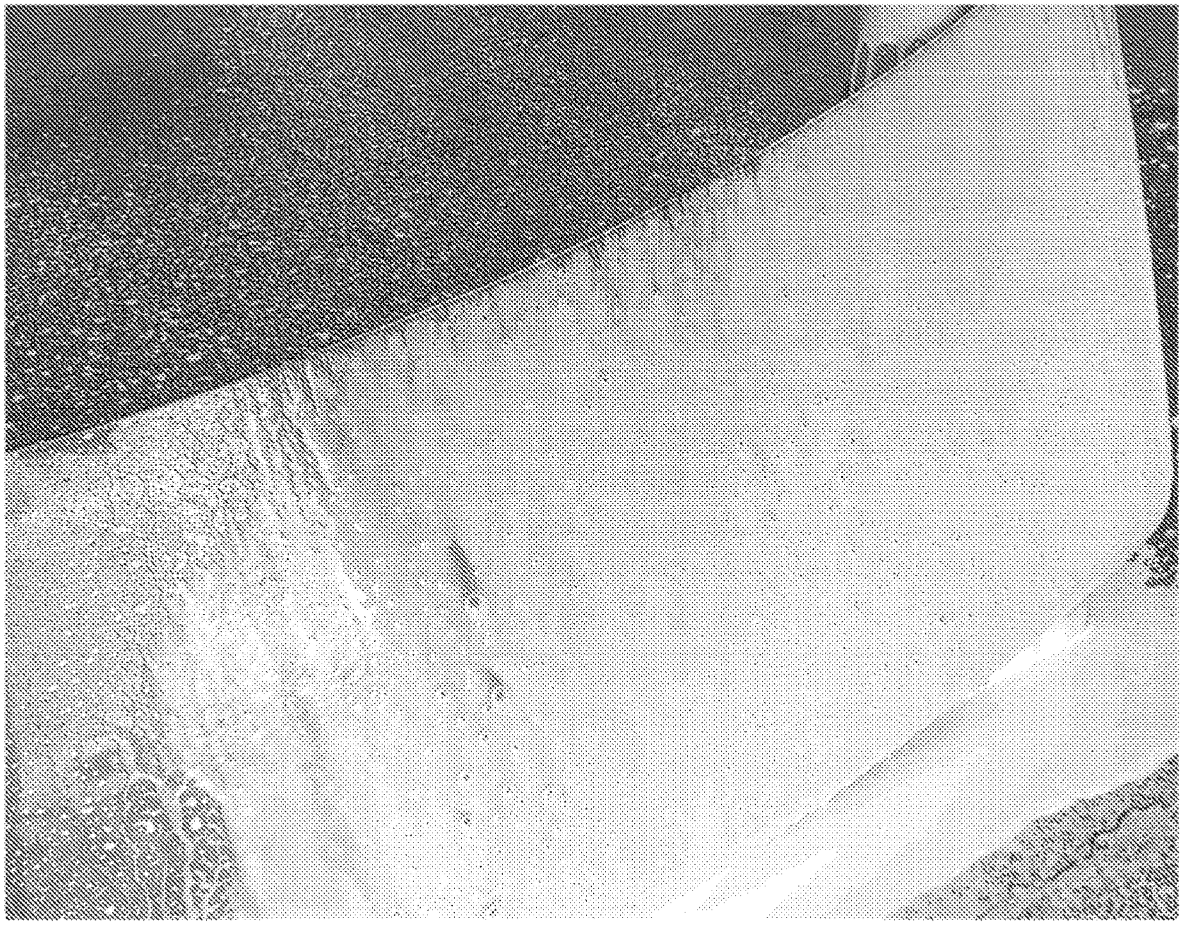
FIG. 3D depicts a car hood about 10 seconds after spraying with composition I3 in accordance with the present disclosure.
Figure 4A:
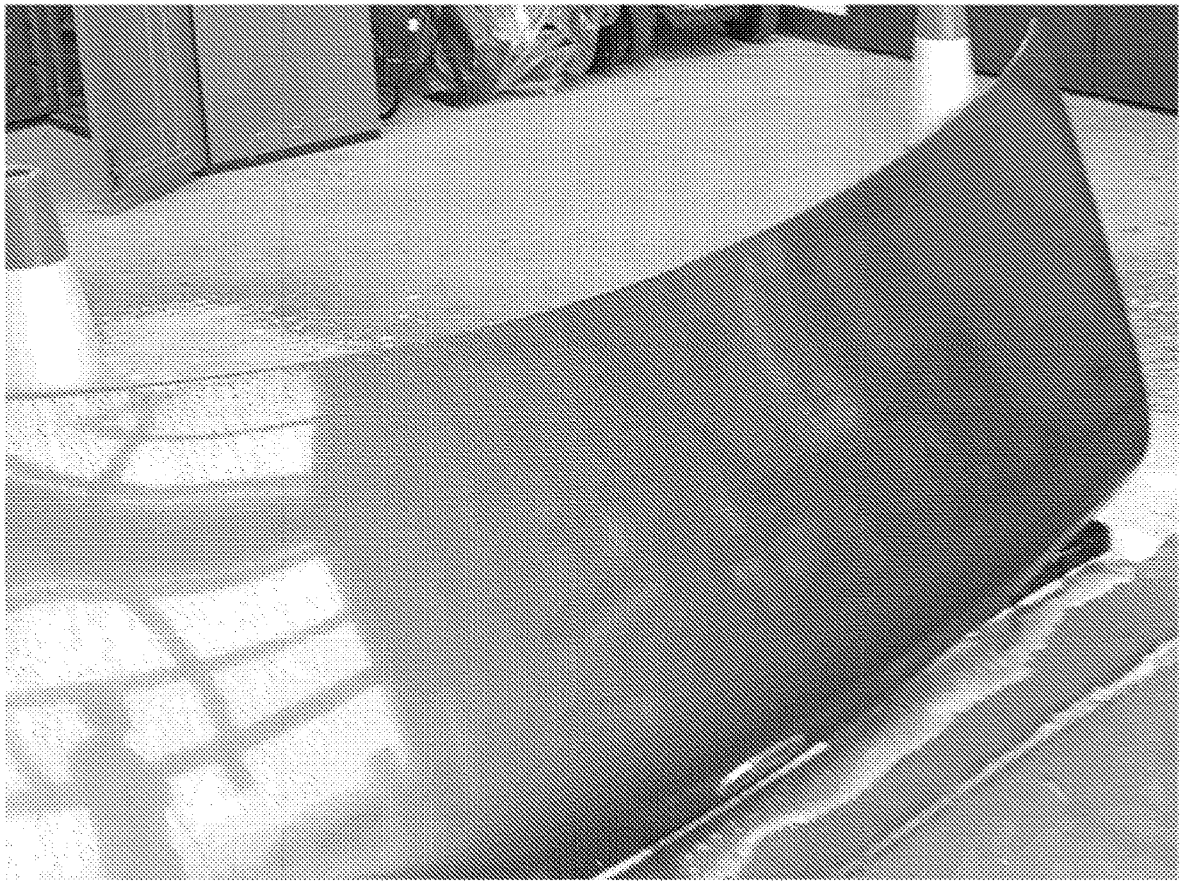
FIG. 4A depicts a car hood before spraying with composition I4 in accordance with the present disclosure.
Figure 4B:
FIG. 4B depicts a car hood during spraying with composition I4 in accordance with the present disclosure.
Figure 4C:
FIG. 4C depicts a car hood immediately after spraying with composition 14 in accordance with the present disclosure.
Figure 4D:
FIG. 4D depicts a car hood about 10 seconds after spraying with composition I4 in accordance with the present disclosure.
Figure 5A:
FIG. 5A depicts a car hood before spraying with composition I5 in accordance with the present disclosure.
Figure 5B:
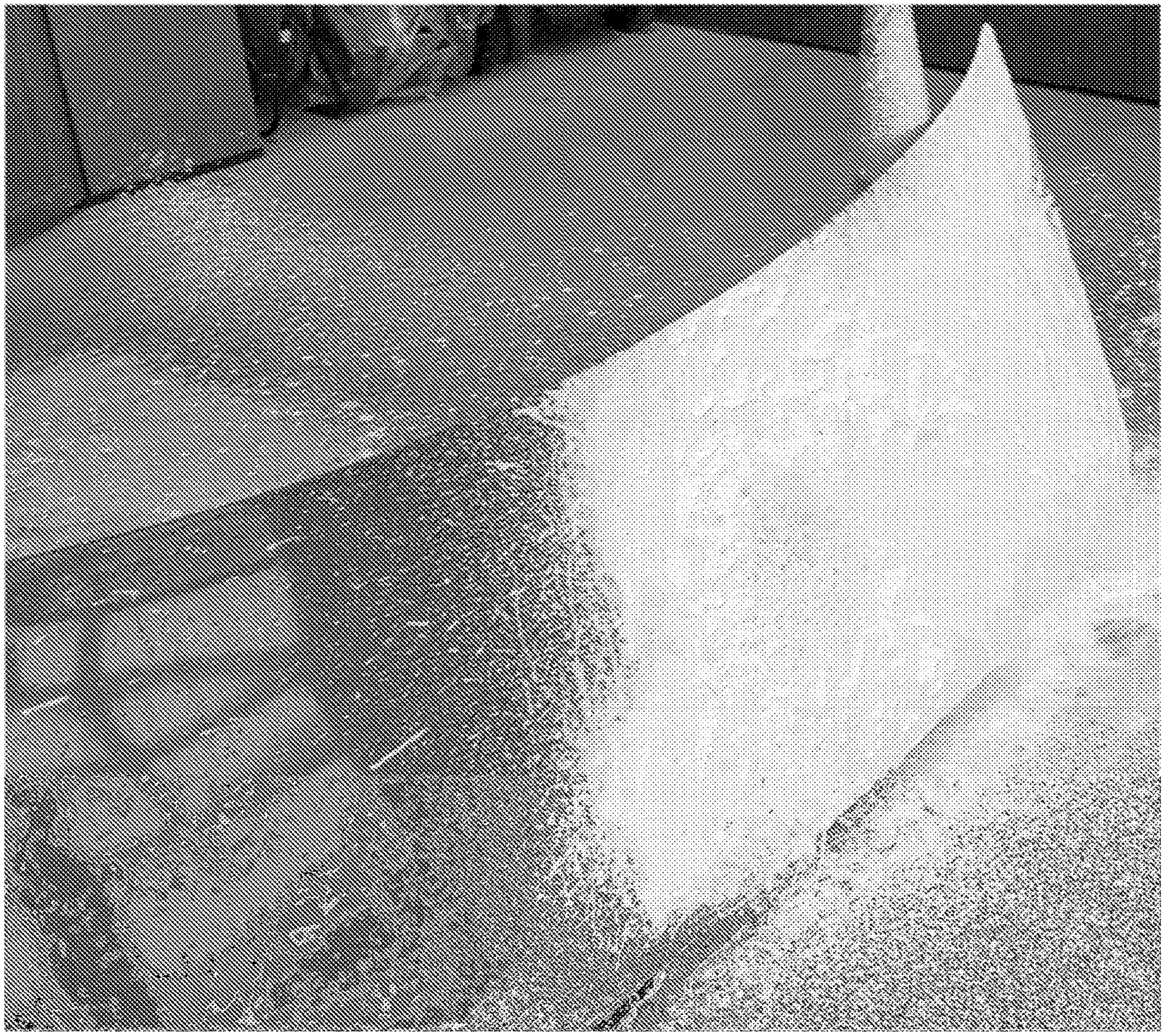
FIG. 5B depicts a car hood during spraying with composition I5 in accordance with the present disclosure.
Figure 5C:
FIG. 5C depicts a car hood immediately after spraying with composition I5 in accordance with the present disclosure.
Figure 5D:
FIG. 5D depicts a car hood about 10 seconds after spraying with composition I5 in accordance with the present disclosure.
Figure 6A:
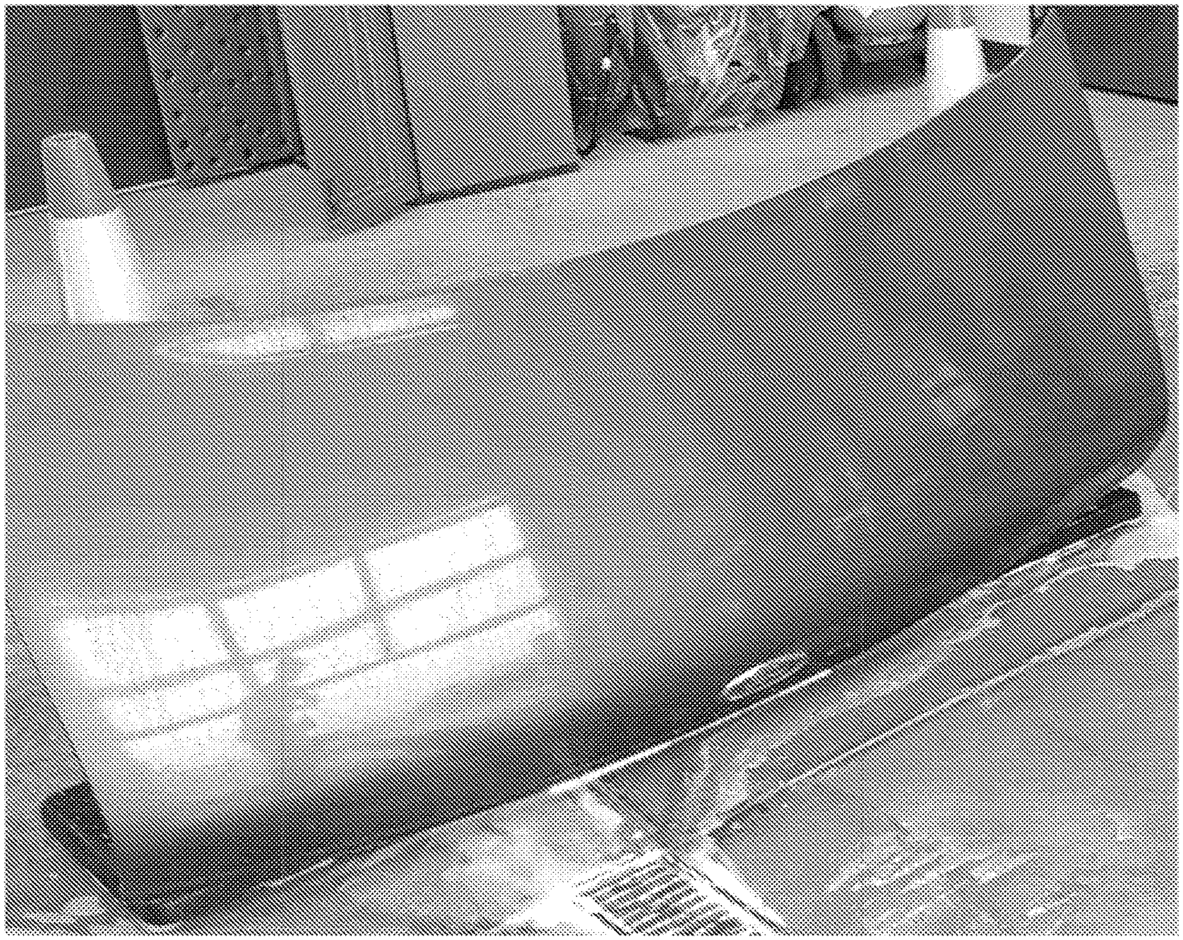
FIG. 6A depicts a car hood before spraying with comparative composition C1.
Figure 6B:
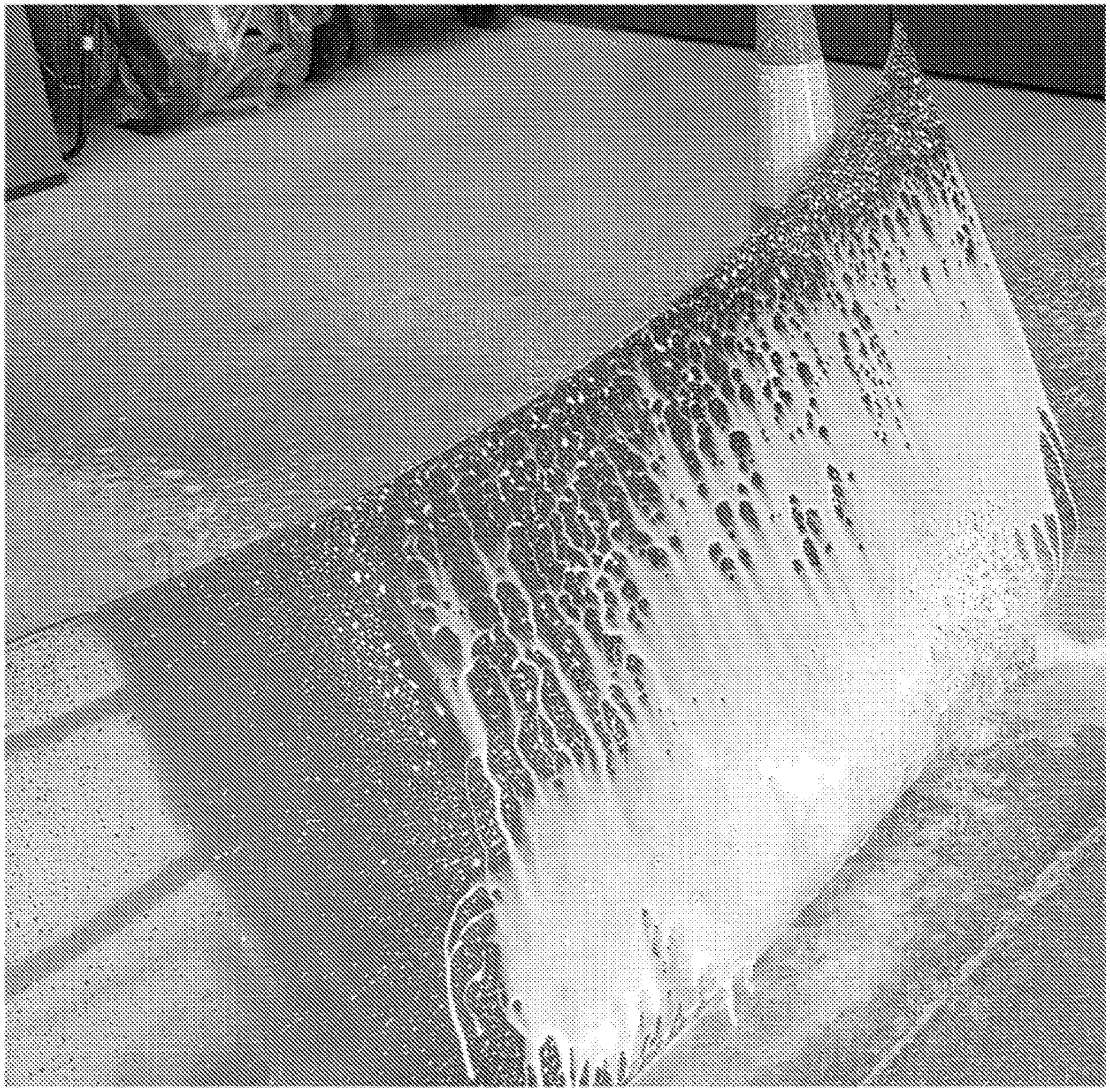
FIG. 6B depicts a car hood during spraying with comparative composition C1.
Figure 6C:
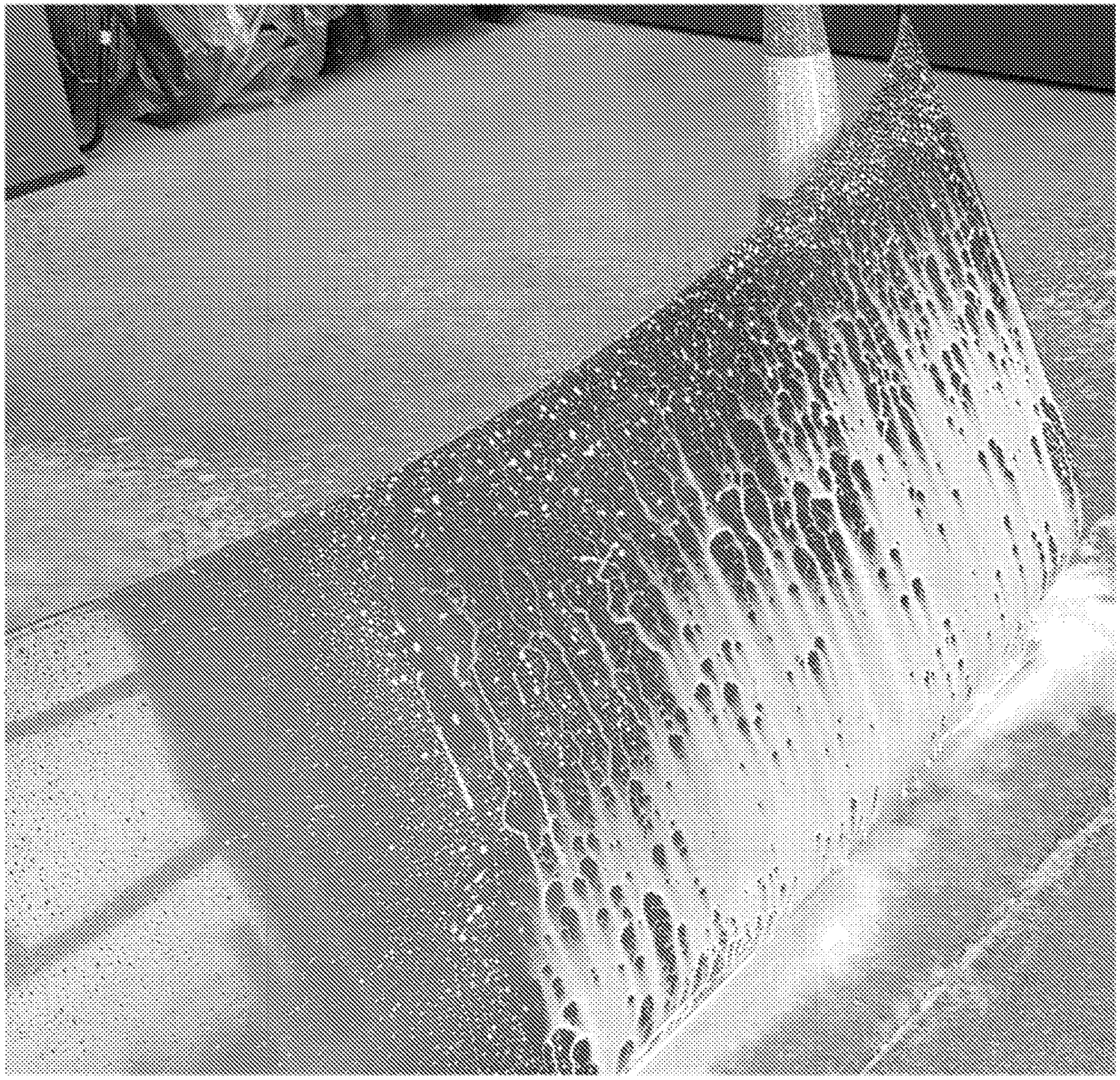
FIG. 6C depicts a car hood immediately after spraying with comparative composition C1.
Figure 6D:
FIG. 6D depicts a car hood about 10 seconds after spraying with comparative composition C1.

The foaming profiles for formulations I1-I5 and C1 are also shown in FIGS. 1A-1D, 2A-2D, 3A-3D, 4A-4D, 5A-5D, and 6A-6D, respectively. As can be seen, I1, I4, and I5 exhibited the best foaming profiles. C1 exhibited an unacceptable foaming profile.

TABLE 4

Comparative foaming profiles.

| Component | I1 | I2 | I3 | I4 | I5 | C1 |
|---|---|---|---|---|---|---|
| Water | 75.195 | 77.695 | 77.695 | 67.695 | 47.695 | 87.695 |
| Merpol ® HCS | 2.5 | 10 | 0 | 10 | 20 | 0 |
| T-Det ® A 900 | 10 | 0 | 10 | 10 | 20 | 0 |
| PEG 8000 | 2 | 2 | 2 | 2 | 2 | 2 |
| Ammonyx ® LMDO | 0.1515 | 0.1515 | 0.1515 | 0.1515 | 0.1515 | 0.1515 |
| Siltech ® E-4135 | 10 | 10 | 10 | 10 | 10 | 10 |
| Uniquat ® QAC-50 | 0.1 | 0.1 | 0.1 | 0.1 | 0.1 | 0.1 |
| Liquitint ® Green HMC | 0.0035 | 0.0035 | 0.0035 | 0.0035 | 0.0035 | 0.0035 |
| Fragrance Porche Glass | 0.05 | 0.05 | 0.05 | 0.05 | 0.05 | 0.05 |
| Foaming profile | ++ | + | + | ++ | ++ | – |

This written description uses examples to illustrate the present disclosure, including the best mode, and also to enable any person skilled in the art to practice the disclosure, including making and using any compositions or systems and performing any incorporated methods. The patentable scope of the disclosure is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claimed disclosure. The term "consisting essentially of" occupies a middle ground between "comprising" and "consisting of".

Where a disclosure or a portion thereof is defined with an open-ended term such as "comprising," it should be readily understood that (unless otherwise stated) the description should be interpreted to also describe such an disclosure using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the disclosure are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

As used herein, the term "about" means plus or minus 10% of the value.

What is claimed is:

1. A composition consisting of:

A) an amino functional silicone emulsion;

B) an amphoteric surfactant;

C) a first non-ionic surfactant;

D) a second non-ionic surfactant;

E) one or more components selected from the group consisting of a foam stabilizer, a preservative, a colorant, and a fragrance; and F) water.

2. The composition of claim 1, wherein the amino functional silicone emulsion consists of an aminoalkyl-functional organopolysiloxane fluid and water, and one or more components selected from the group consisting of a glycol, an emulsifier, a pH adjuster, and a viscosity adjuster.

3. The composition of claim 2, wherein the aminoalkyl-functional organopolysiloxane fluid is selected from the group consisting of an amine-alkyl/dimethyl copolymer, a polar amine/alkyl functional block, an amine/alkoxy end-blocked silicone, and combinations thereof.

4. The composition of claim 1, wherein the amino functional silicone emulsion is present in an amount of from about 0.5% to about 15% by weight of the composition.

5. The composition of claim 1, wherein the amphoteric surfactant is present in an amount of from about 0.001% to about 25% by weight of the composition.

6. The composition of claim 1, wherein the amphoteric surfactant is selected from the group consisting of lauryl/myristyl amidopropylamine oxide (LMDO), a betaine, cocamidopropylamine oxide, lauramine oxide, myristyl/cetyl amine oxide, myristamine oxide, cocamidopropyl betaine, cocamidopropyl hydroxysultaine, and combinations thereof.

7. The composition of claim 1, wherein the first non-ionic surfactant and the second non-ionic surfactant are present in an amount of from about 0.5% to about 30% by weight of the composition.

8. The composition of claim 1, wherein the first non-ionic surfactant has a hydrophilic-lipophilic balance (HLB) value of at least about 14.

9. The composition of claim 1, wherein the second non-ionic surfactant has an HLB value of at least about 12.

10. The composition of claim 1, wherein the first non-ionic surfactant has an initial Ross Miles foam height of at least about 14 cm.

11. The composition of claim 1, wherein the second non-ionic surfactant has an initial Ross Miles foam height of at least about 11 cm.

12. The composition of claim 1, wherein the first non-ionic surfactant is an alcohol ethoxylate.

13. A method of treating an automotive surface, the method comprising applying the composition of claim 1 to an automotive surface.

14. The method of claim 13, wherein the automotive surface is selected from the group consisting of a tire, wheel, glass, paint, hood, roof, trunk, an exterior part and all car exterior, and combinations thereof.

15. The method of claim 13, wherein the composition is a fluid and the fluid is applied by the means of an aerosol, a trigger sprayer, a sponge and combinations thereof.

16. A composition consisting of:

A) an amino functional silicone emulsion;

B) a lauryl/myristyl amidopropyl amine oxide;

C) a first non-ionic surfactant;

D) a second non-ionic surfactant;

E) a polyethylene glycol;

F) one or more components selected from the group consisting of a foam stabilizer, a preservative, a colorant, and a fragrance; and G) water.

17. The composition of claim 16, wherein the amino functional silicone emulsion consists of an aminoalkyl-functional organopolysiloxane fluid and water, and one or more components selected from the group consisting of a glycol, an emulsifier, a pH adjuster, and a viscosity adjuster.

18. The composition of claim 16, wherein the first non-ionic alcohol ethoxylate is selected from the group consisting of tridecylalcohol ethoxylate, C12-14 secondary alcohol ethoxylate, and combinations thereof; and optionally, wherein the tridecylalcohol ethoxylate is branched, and/or wherein the C12-14 secondary alcohol ethoxylate comprises 12, 15, 20, 31, or 41 ethylene oxide (EO) groups.

19. The composition of claim 17, wherein the first non-ionic alcohol ethoxylate and the second non-ionic alcohol ethoxylate are present in an amount of from about 0.5% to about 30% by weight of the composition.

20. The composition of claim 12, wherein the alcohol ethoxylate is tridecylalcohol ethoxylate, C12-14 secondary alcohol ethoxylate, or combinations thereof; and optionally, wherein the tridecylalcohol ethoxylate is branched, and/or wherein the C12-14 secondary alcohol ethoxylate comprises 12, 15, 20, 31, or 41 ethylene oxide (EO) groups.

* * * * *